(12) United States Patent
Kannan et al.

(10) Patent No.: US 7,766,417 B2
(45) Date of Patent: Aug. 3, 2010

(54) COWL STRUCTURE OF A MOTOR VEHICLE

(75) Inventors: Yoko Kannan, Ebina (JP); Hiroyuki Iwanami, Suginami-ku (JP); Tatsuzo Tomita, Machida (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 12/016,055

(22) Filed: Jan. 17, 2008

(65) Prior Publication Data
US 2008/0284208 A1 Nov. 20, 2008

(30) Foreign Application Priority Data
Jan. 22, 2007 (JP) ............... 2007-011352
Oct. 3, 2007 (JP) ............... 2007-259948

(51) Int. Cl.
*B62D 25/08* (2006.01)

(52) U.S. Cl. ............... 296/187.04; 296/187.09; 296/192; 296/96.21

(58) Field of Classification Search ............ 296/187.04, 296/187.09, 192, 193.11, 96.21
See application file for complete search history.

(56) References Cited

U.S. PATENT DOCUMENTS

| | | | | |
|---|---|---|---|---|
| 4,466,654 | A * | 8/1984 | Abe ............... | 296/192 |
| 4,938,526 | A * | 7/1990 | Sannomiya et al. ...... | 296/192 |
| 6,682,131 | B2 * | 1/2004 | Hayashi ............ | 296/192 |
| 6,869,134 | B2 * | 3/2005 | Kato et al. ......... | 296/192 |
| 6,935,673 | B1 * | 8/2005 | Derleth et al. ...... | 296/72 |
| 7,008,006 | B2 * | 3/2006 | Steinhauser et al. .... | 296/181.2 |
| 2003/0178873 | A1 * | 9/2003 | Kato et al. ......... | 296/192 |
| 2004/0070229 | A1 * | 4/2004 | Steinhauser et al. .... | 296/96.21 |
| 2008/0116721 | A1 * | 5/2008 | Shimura ............ | 296/192 |
| 2008/0252103 | A1 * | 10/2008 | Bechtold et al. ...... | 296/192 |

FOREIGN PATENT DOCUMENTS

| | | |
|---|---|---|
| DE | 4105679 | 8/1991 |
| DE | 10329854 | 2/2004 |
| DE | 10323725 | 12/2004 |
| JP | 2004-034832 | 2/2004 |
| JP | 2006-27417 | 2/2006 |
| WO | 2006059049 | 6/2006 |

OTHER PUBLICATIONS

Patent Abstracts of Japan publication No. 2006-027417, published Feb. 2, 2006 (11 pages).
European Search Report for European Application No. 08150394.8-1268, dated Jan. 27, 2009 (7 pages).
English Patent Abstract of DE10329854 from esp@cenet, published Feb. 26, 2004 (1 page).
English Patent Abstract of DE10323725 from esp@cenet, published Dec. 23, 2004 (1 page).
Mechanical English translation of Patent Abstract of DE4105679 from google.com, published Aug. 29, 1991 (1 page).
English Patent Abstract of WO2006059049 from esp@cenet, published Jun. 8, 2006 (1 page).
Office Action in Chinese Patent Application No. 2008100023953, mailed Jul. 31, 2009 (4 pages).
Mechanical English translation of Office Action in Chinese Patent Application No. 2008100023953, mailed Jul. 31, 2009 (6 pages).
English Patent Abstract of JP2004-034832 from esp@cenet, published Feb. 5, 2004 (1 page).

* cited by examiner

*Primary Examiner*—Jason S Morrow
(74) *Attorney, Agent, or Firm*—Osha • Liang LLP

(57) ABSTRACT

A vehicle cowl structure includes a cowl box including a closed cross-section, an inclined holding surface configured to hold a lower end portion of a windshield, an upper wall extending toward an interior of a vehicle cabin from an upper end of the holding surface, a vertical wall extending downward from an inside end of the upper wall, a bottom wall extending toward a front portion of the vehicle from a lower end of the vertical wall, and a recessed portion formed on the upper wall extending in a direction of the width of the vehicle, wherein the recessed portion is depressed toward an inside of the cowl box and is smoothly curved from the windshield holding surface to the vertical wall.

4 Claims, 7 Drawing Sheets

US 7,766,417 B2

COWL STRUCTURE OF A MOTOR VEHICLE

CROSS-REFERENCE TO RELATED APPLICATIONS

The present application claims priority from Japanese Patent Application Nos. 2007-011352, filed on Jan. 22, 2007, and 2007-259948, filed on Oct. 3, 2007. The entire disclosure of Japanese Patent Application No. 2007-011352 and Japanese Patent Application No. 2007-259948 are hereby incorporated herein by reference.

BACKGROUND OF THE DISCLOSURE

1. Field of the Disclosure

The present invention relates to cowl structures of motor vehicles.

2. Description of the Related Art

In the field of motor vehicles, for protecting pedestrians, there have been proposed cowl structures that dampen a shock applied to the pedestrian when his or her head collides against the windshield.

In the motor vehicles of such type, in a space located in front of an instrument panel and below the windshield, there may be installed a cowl box having a generally rectangular closed cross section and extending transversely (i.e., in the direction of the width of the vehicle). Fresh air is led into a vehicle cabin through the cowl box.

A lower end of the windshield may be bonded to a glass holding surface provided on an upper wall of a dash upper panel that constitutes a rear part of the cowl box. For dampening a shock applied to the windshield, a vertical wall that constitutes an inboard part of the cowl box may be formed having a transversely-extending opening. Proximate to the opening, there may be a part having a generally bent cross section, so that upon receiving a shock load, the bent part may fold and deform, thereby dampening the shock load. One technique for such shock damping is disclosed in Japanese Laid-open Patent Application (Tokkai) 2006-27417 at pages 45 and FIG. 1.

SUMMARY OF THE CLAIMED SUBJECT MATTER

In one aspect, the present disclosure relates to a vehicle cowl structure including a cowl box having a closed cross section, an inclined holding surface configured to hold a lower end portion of a windshield, an upper wall extending toward an interior of a vehicle cabin from an upper end of the inclined holding surface, a vertical wall extending downward from an inside end of the upper wall, a bottom wall extending toward a front portion of the vehicle from a lower end of the vertical wall, and a recessed portion formed on the upper wall extending in a direction of the width of the vehicle, wherein the recessed portion is depressed toward an inside of the cowl box and is smoothly curved from the inclined holding surface to the vertical wall.

In another aspect, the present disclosure relates to a vehicle cowl structure including a cowl box having a closed cross-section, wherein the cowl box includes a holding surface means for holding a lower end portion of a windshield, an upper wall means for extending toward an interior of a vehicle cabin from an upper end of the holding surface means, a vertical wall means for extending downward from an inside end of the upper wall means, a bottom wall means for extending toward a front portion of the vehicle from a lower end of the vertical wall means, and a recess means formed on the upper wall means, the recess means extending in a direction of the width of the vehicle, wherein the recess means is depressed toward an inside of the cowl box and is smoothly curved from the holding surface means to the vertical wall means.

BRIEF DESCRIPTION OF DRAWINGS

Features of the present disclosure will become more apparent from the following description in conjunction with the accompanying drawings.

DETAILED DESCRIPTION

In the following, embodiments of the present disclosure will be described in detail with reference to the accompanying drawings.

First Embodiment

Figure 1:
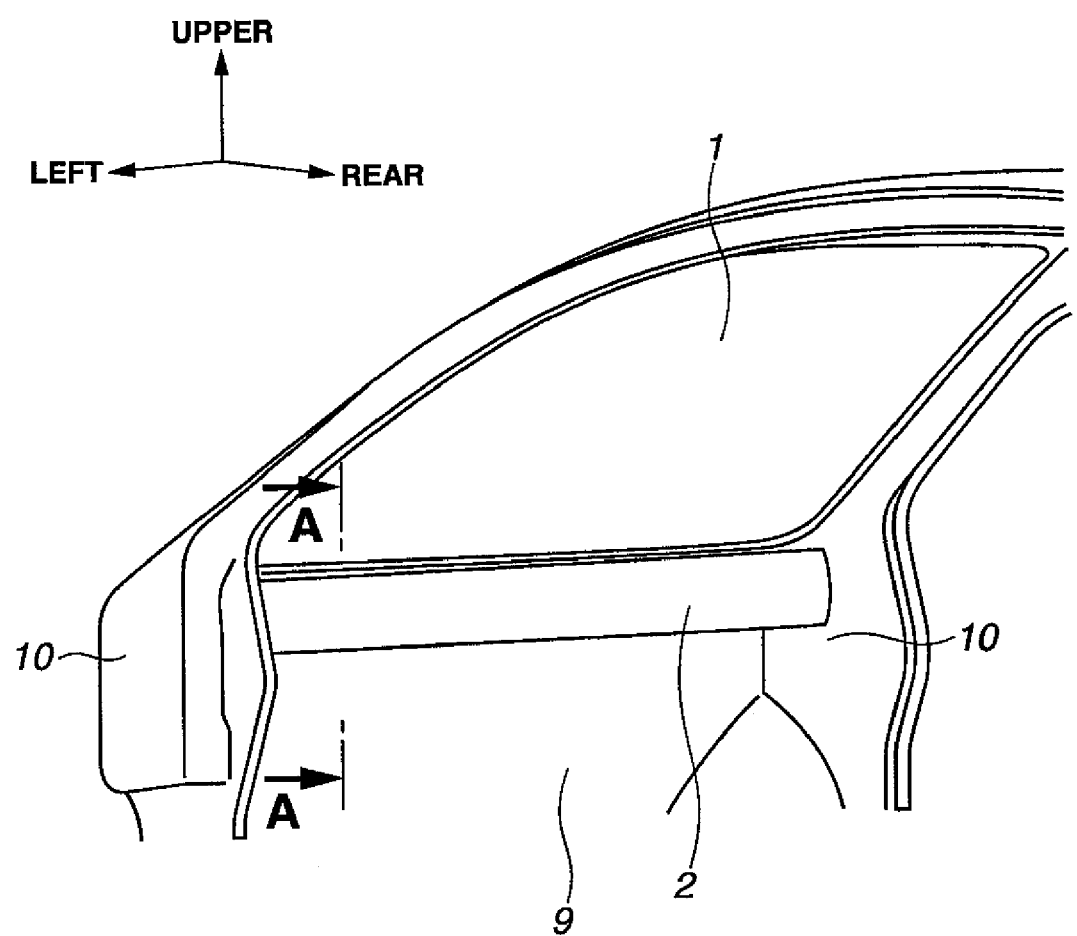
FIG. 1 is a front perspective view of a vehicle cabin with front doors and an instrument panel removed, with which a first embodiment of the present disclosure is incorporated.
Figure 2:
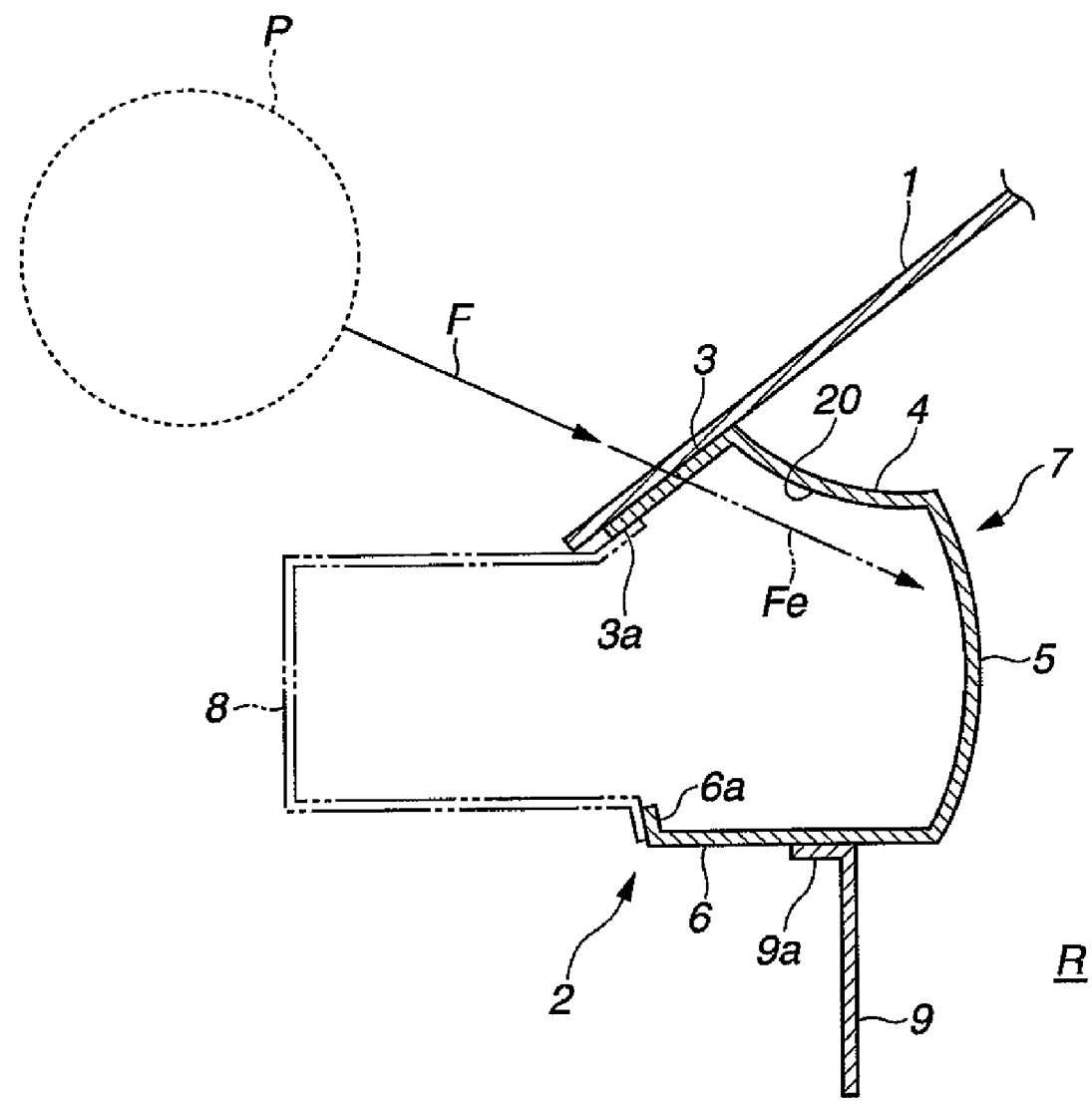
FIG. 2 is an enlarged sectional view taken along the line A-A of FIG. 1.
Figure 3:
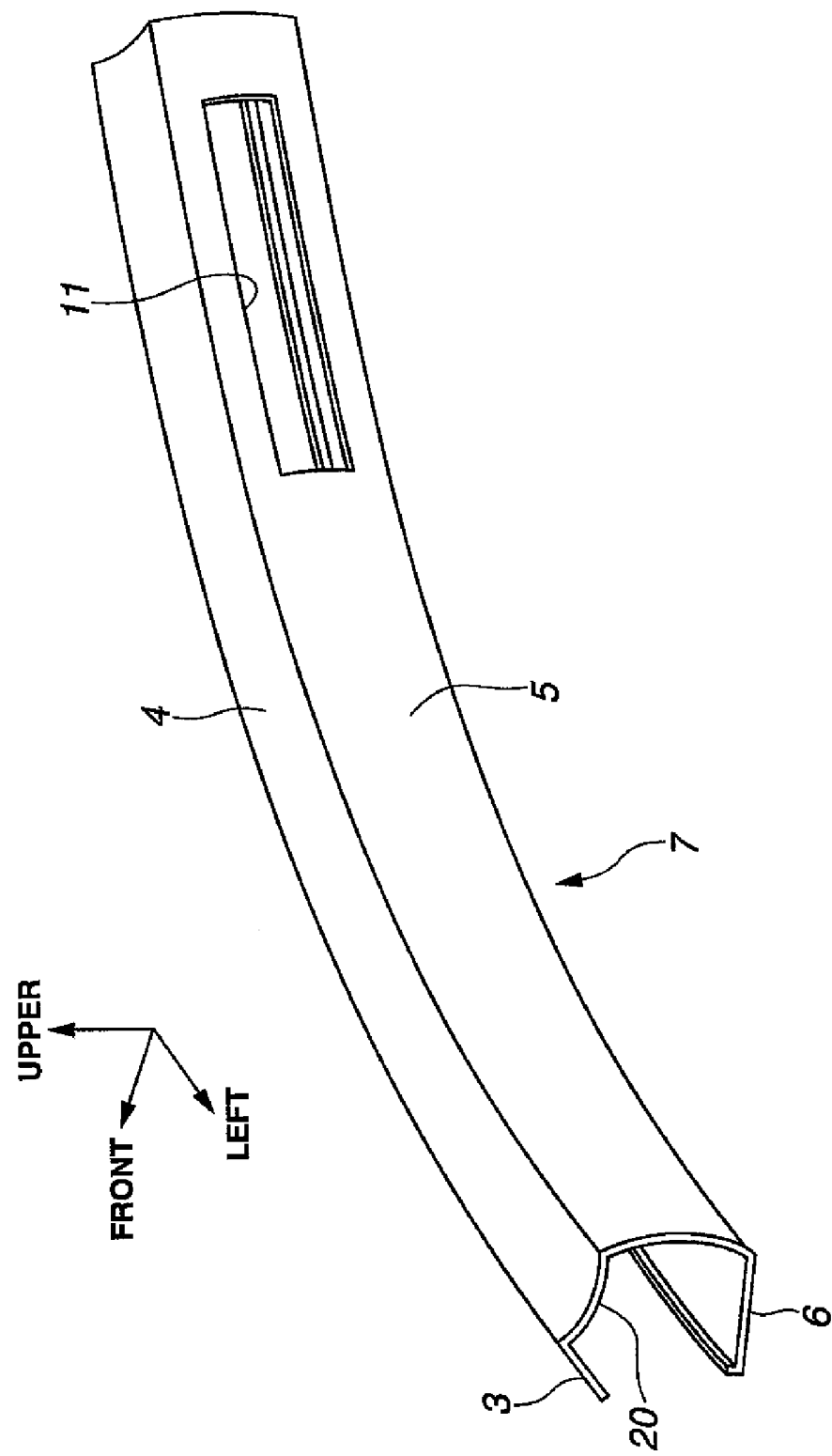
FIG. 3 is a perspective view of a dash upper panel used in the first embodiment.

FIG. 1 is a front perspective view of a vehicle cabin with front doors and an instrument panel removed, FIG. 2 is an enlarged sectional view taken along the line A-A of FIG. 1 and FIG. 3 is a perspective view of a dash upper panel.

As is seen from FIGS. 1 and 2, a cowl structure of this embodiment comprises a cowl box 2 that extends in the direction of the vehicle width along a lower edge of a windshield 1 and has an enclosed cross section. A dash upper panel 7 forming a rear portion of the cowl box 2 has at an upper portion thereof an inclined windshield holding surface 3 that holds a lower end portion of the windshield 1. Onto an outer part of the windshield holding surface 3, there is bonded the lower end portion of the windshield for holding the same.

That is, the dash upper panel 7 includes an upper wall 4 that extends from an upper edge of the windshield holding surface 3 toward an inside of a vehicle cabin (as shown in FIG. 2), a vertical wall 5 that extends downward from an inside edge of the upper wall 4 and a bottom wall 6 that extends from a lower edge of the vertical wall 5 toward a front side of the vehicle. With these walls, the rear portion of the cowl box 2 is constructed.

As is seen from FIG. 3, the dash upper panel including windshield holding surface 3, upper wall 4, vertical wall 5, and bottom wall 6 has a generally U-shaped cross-section and is curved along an instrument panel (not shown) at a front side of the vehicle. Furthermore, as seen from FIG. 2, a cowl front portion 8 that has a generally U-shaped cross section extends between a front end portion 3a of windshield holding surface 3 and a front end portion 6a of bottom wall 6. Thus, a cowl box 2 having an enclosed cross section may be constructed.

As shown in FIG. 2, a lower surface of the bottom wall 6 of the dash upper panel 7 may be secured to an upper end 9a of a dash panel 9 by which a front compartment and a vehicle cabin R may be bounded. Furthermore, as shown in FIG. 1, lateral ends of the dash upper panel 9 may be connected to and supported by respective front pillars 10.

Cowl box 2 may be constructed such that when outside air is introduced thereto from an upper surface of front portion 8 extending forward of windshield holding surface 3, the outside air may be introduced to an air conditioning device (not shown) through an outside air opening (11 of FIG. 3) formed in vertical wall 5.

In the present disclosure, upper wall 4 of the dash upper panel 7 may be formed with a recessed portion 20 that is depressed toward the inside of (i.e., concave with respect to) cowl box 2 and may extend in the width (i.e., transverse) direction of the vehicle. Thus, recessed portion 20 may be smoothly curved from windshield holding surface 3 to vertical wall 5.

Furthermore, in this embodiment, vertical wall 5 may be swelled toward the interior of (i.e., concave with respect to) the vehicle cabin, that is, in a direction toward a rear portion of the vehicle.

In the vehicle cowl structure disclosed in the embodiment shown in FIG. 2, when an pedestrian (or any other object) P collides obliquely from an upper position against a lower portion of the windshield 1, an impact force F of the pedestrian P is transmitted to upper wall 4, which extends from the upper edge of the windshield holding surface 3 toward the inside of the vehicle cabin, and thus deforms the upper wall 4.

Upon this impact, because recessed portion 20 may be depressed toward the inside of the cowl box 2, the deformation of upper wall 4 may be controlled so that the deformation by the impact force F obliquely applied to the windshield 1 from the upper position may advance toward the inside of the cowl box 2 (i.e., outside of the vehicle cabin).

Accordingly, due to the outward deformation of the upper wall 4, the upper wall 4 may deform in a direction opposite an operation direction Fe of the impact force F, thus an initial reaction force may be increased so that the shock absorbing ability of upper wall 4 against the impact energy may be improved.

Furthermore, in this embodiment, because the upper wall 4 is smoothly curved from the windshield holding surface 3 to the vertical wall 5, the likelihood of undesirable bending of the upper wall 4 from stress concentration may be reduced. Thus, this embodiment advantageously promotes a beneficial reaction force.

Furthermore, in this embodiment, because vertical wall 5 extends downward from the inside end of upper wall 4 and is therefore is swelled toward the interior of the vehicle cabin, transmission of the impact force F from upper wall 4 to vertical wall 5 may deform vertical wall 5 without resulting in a high reaction force. Because of such curved structure, a reaction force generated in a latter stage of the impact may be reduced compared to that of the initial stage. Therefore, an effective absorption of impact energy results within a limited amount of space.

As described above, a sharp ridge may exist between upper wall 4 and vertical wall 5 but, if desired, a rounded, more elongate, corner may be employed instead.

Second Embodiment

Figure 4:
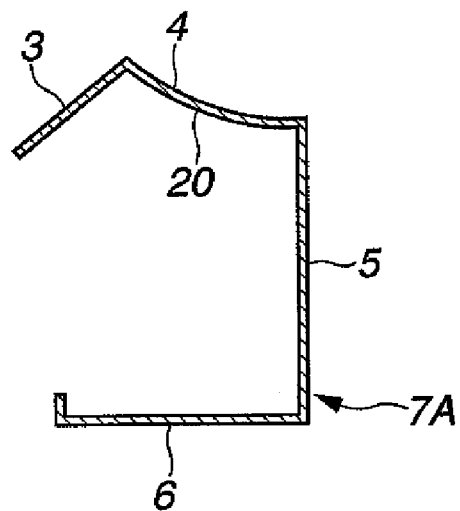
FIG. 4 is a sectional view of a dash upper panel used in a second embodiment of the present disclosure.

FIG. 4 is a sectional view of a dash upper panel. A vehicle cowl structure of this second embodiment is equipped with the same (or similar) component members of the vehicle cowl structure of the first embodiment described above. Accordingly, the same component members are denoted by the same reference numerals and repetitious explanation of such members is omitted.

The vehicle cowl structure of the second embodiment may be substantially similar that of the above-mentioned first embodiment. As is seen from FIG. 4, a dash upper panel 7A that constitutes a rear portion of the cowl box 2 includes an upper wall 4 extending from an upper edge of windshield holding surface 3 toward the inside of the vehicle cabin. A vertical wall 5 extending downward between an inside edge of upper wall 4 and bottom wall 6. Upper wall 4 may be formed with a recessed portion 20 that may be depressed toward the inside of (i.e., concave with respect to) cowl box 2 and extends in the direction of the vehicle width. However, as shown in FIG. 4, vertical wall 5 is not swelled and substantially flat and substantially vertical.

Although vertical wall 5 may be shaped to have a vertically flat surface, upper wall 4, useful in controlling generation of an initial reaction force against impact force F, may be nonetheless be constructed with recessed portion 20. Therefore, dash upper panel 7A may exhibit substantially the same operation and results as above-mentioned first embodiment (7 of FIG. 2).

Alternative Embodiments

It should be noted that the present disclosure shall not limited to the above-mentioned first and second embodiments. As such, various modifications of them may be carried out without departing from the scope of the invention as claimed.

Figure 5:
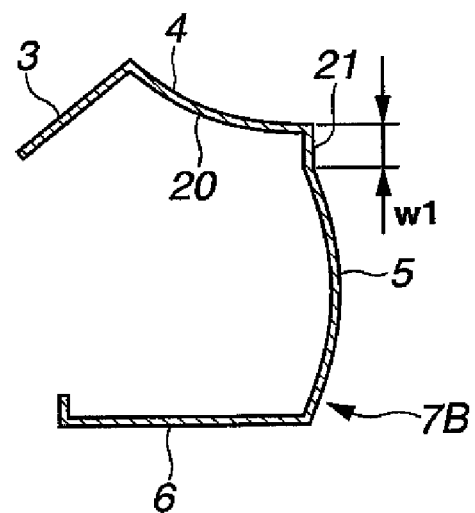
FIG. 5 is a sectional view of a dash upper panel used in a first modification of the present disclosure.
Figure 6:
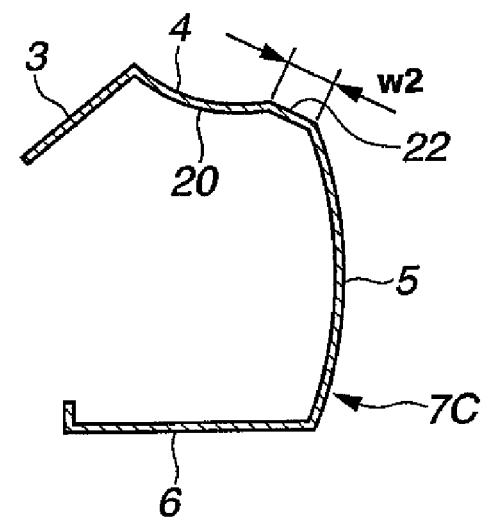
FIG. 6 is a sectional view of a dash upper panel used in a second modification of the present disclosure.
Figure 7:
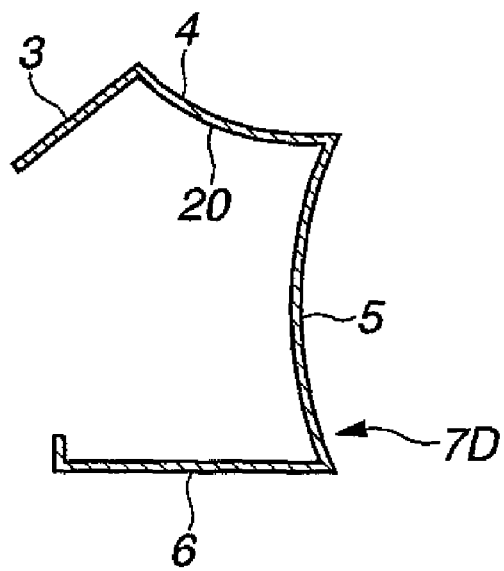
FIG. 7 is a sectional view of a dash upper panel used in a third modification of the present disclosure.

Referring now to FIGS. 5-7, first (FIG. 5), second (FIG. 6), and third (FIG. 7) modifications of the dash upper panel (e.g., 7 of FIG. 2.) used in the cowl structure of the present disclosure will be described. In the following description, the similar or substantially the same component members as those of the above-mentioned first and second embodiments may be denoted by the same reference numerals and repetitious explanations of such members is omitted.

FIG. 5 is a sectional view of the dash upper panel in accordance with a first modification. In the dash upper panel 7B of this modification, upper wall 4 may be formed with a recessed portion 20 that is depressed toward the inside of (i.e., concave with respect to) cowl box 2 and extending in the direction of the vehicle width. Additionally, vertical wall 5 may be swelled toward the interior of (i.e., convex with respect to) the vehicle cabin. In particular, an upper end portion of the vertical wall 5 may be formed with a flat surface portion 21 of a predetermined vertical length W1 that is integrally connected to the upper wall 4. Flat surface portion 21 may extend downward at a substantially right angle from an inside end of upper wall 4 and may have a lower end from which the swelled vertical wall 5 extends downward.

Accordingly, in the first modification, although flat surface portion 21 may be formed at an upper end portion of vertical wall 5, substantially the same result as in the above-mentioned first embodiment may be obtained because of presence of recessed portion 20 on upper wall 4. Furthermore, because an impact force F applied to the windshield 1 (e.g., FIG. 2) may be transmitted from upper wall 4 to swelled vertical wall 5 through flat surface portion 21, a reaction force generated at the end of the impacting may be reduced, and thus, effective impact energy absorption may be carried out in a limited amount of energy-absorbing space.

FIG. 6 is a sectional view of a dash upper panel 7C in accordance with a second modification. In upper panel 7C, upper wall 4 may be formed comprising a recessed portion 20 and an inside end portion of upper wall 4 may be formed comprising a flat surface portion 22 of a predetermined longitudinal length W2, integrally connected to vertical wall 5.

Accordingly, in the second modification, although flat surface portion 22 may be formed at an inside end portion of the upper wall 4, the presence of the recessed portion 20 at upper wall 4 may increase an initial reaction force against an impact force. Furthermore, as with the second modification, because vertical wall 5 is swelled toward the interior of the vehicle cabin, substantially the same result as in the above-mentioned first embodiment and the first modification may be obtained.

Referring now to FIG. 7, a sectional view of a dash upper panel 7D of a third modification is shown. In dash upper panel 7D, upper wall 4 may be formed comprising a recessed portion 20, and vertical wall 5 may be swelled in a reversed direction, that is, toward the interior of (i.e., concave with respect to) cowl box 2.

Accordingly, in the third modification, although vertical wall 5 may be swelled toward the interior of cowl box 2, upper wall 4 mainly controlling generation of an initial reaction force against an impact force F may be constructed to have recessed portion 20 and thus, substantially same results as those configurations described above.

Referring generally to FIGS. 8-12, advantages of the present disclosure will be described by a graph depicting a comparison between the first (FIG. 2) and second (FIG. 4) embodiments and graphs depicting comparisons between the second embodiment, a first comparative example, and a second comparative example.

Figure 8:
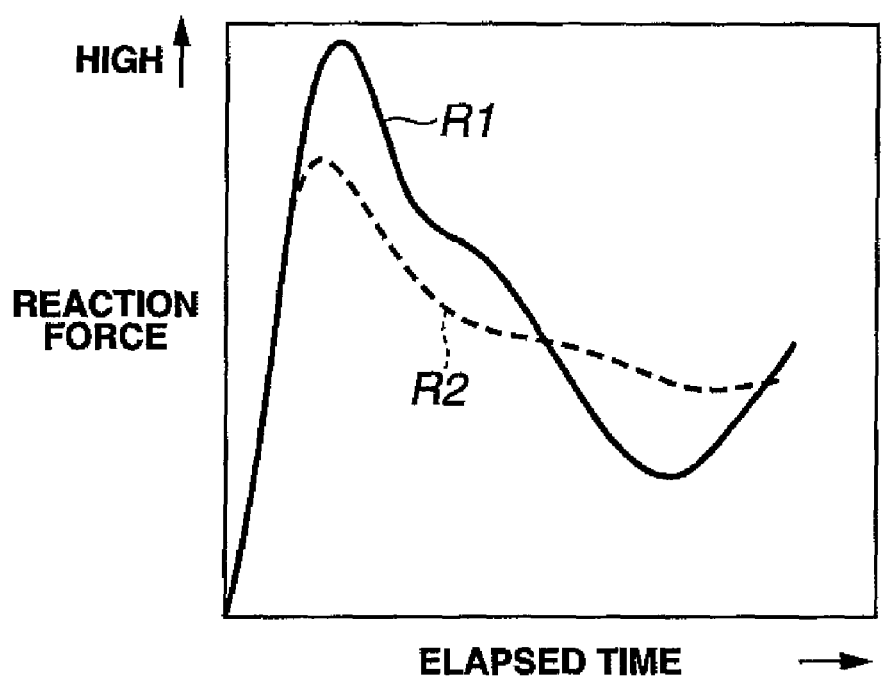
FIG. 8 is a graph showing reaction force characteristics of the first and second embodiments, comparatively.

Referring now to FIG. 8, a graph depicting the results of a comparison between the first and second embodiments in terms of a reaction force characteristic of them is shown. In the graph of FIG. 8, the X-axis defines elapsed time and the Y-axis shows reaction force. In FIG. 8, a solid line depicts the characteristic R1 of the first embodiment and a broken line shows the characteristic R2 of the second embodiment. As is shown in the graph of FIG. 8, one of skill in the art would understand that a peak of the initial reaction force of the first (R1) embodiment is higher than that of the initial reaction force of the second (R2) embodiment. Therefore, regarding an increased initial reaction force, the first embodiment my be superior to the second embodiment.

Figure 9:
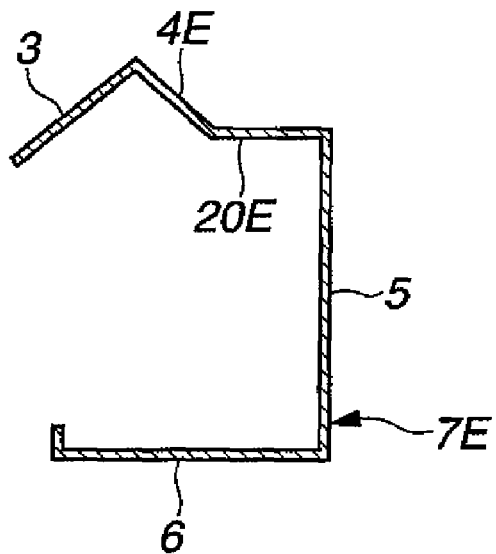
FIG. 9 is a sectional view of a dash upper panel of a first comparative example.
Figure 10:
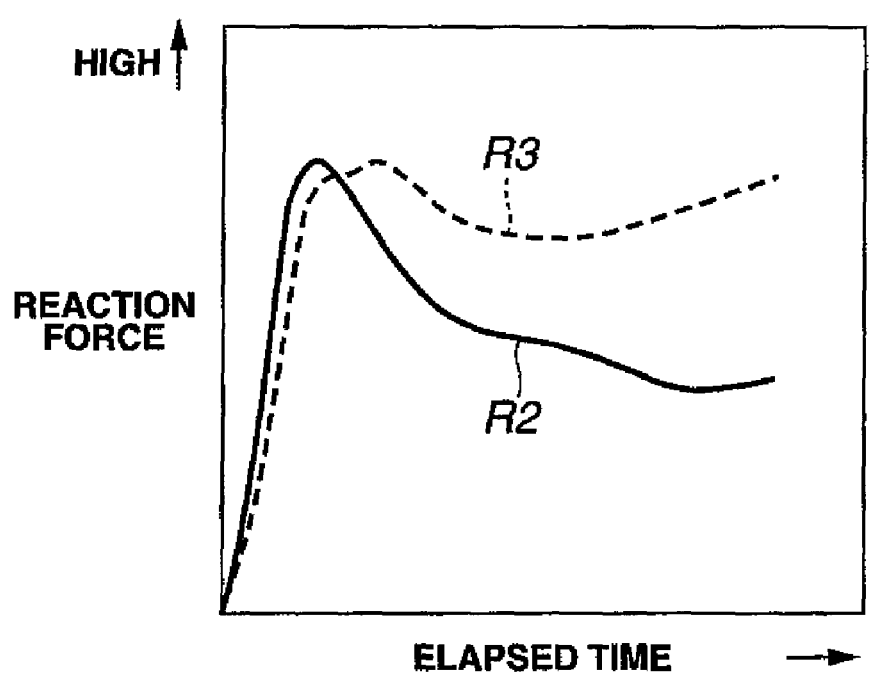
FIG. 10 is a graph showing reaction force characteristics of the second embodiment and the first comparative example, comparatively.

Referring now to FIGS. 9 and 10, the results of a comparison between the second embodiment (FIG. 4) and a first comparative example (FIG. 9) is shown. FIG. 9 is a sectional view of a dash upper panel 7E of the first comparative example, wherein upper wall 4 is formed having a recessed portion 20E that is depressed toward the interior of the cowl box 2 in a manner to have a generally angled cross section, wherein the remainder of the construction of upper panel 7E is substantially the same as that of the above-described second embodiment.

FIG. 10 depicts a graph showing the results of the comparison between the second embodiment and the first comparative example. As with FIG. 8, the X-axis of FIG. 10 defines elapsed time and the Y-axis shows reaction force. In FIG. 10, a solid line depicts the characteristic R2 of the second embodiment and a broken line shows the characteristic R3 of the first comparative example. As shown in FIG. 10, one of skill would understand that a peak of the initial reaction force of the second embodiment (R2) is higher than that of the first comparative example (R3). Therefore, regarding an increased initial reaction force, the construction of the second embodiment may be superior to that of the first comparative example.

Figure 11:
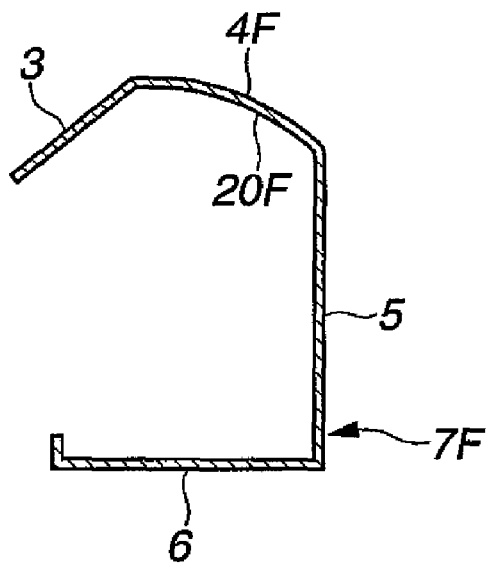
FIG. 11 is a sectional view of a dash upper panel of a second comparative example.
Figure 12:
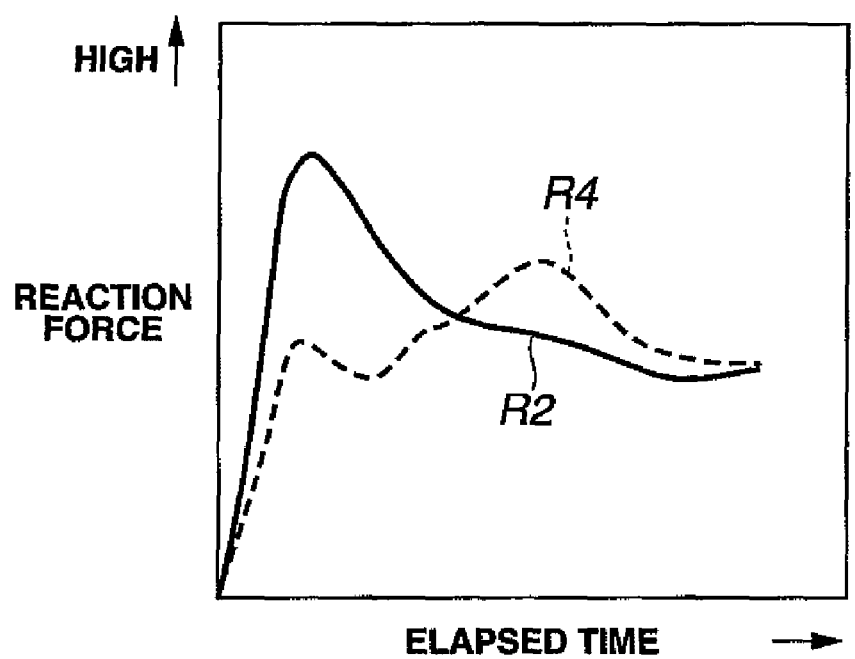
FIG. 12 is a graph showing reaction force characteristics of the second embodiment and the second comparative example, comparatively.

Referring now to FIGS. 11 and 12, the results of a comparison between the second embodiment (FIG. 4) and a second comparative example (FIG. 11) are shown. FIG. 11 depicts a sectional view of a dash upper panel 7F of the second comparative example. In the dash upper panel 7F, upper wall 4 is formed comprising a recessed portion 20F that is rounded outward from (i.e., convex with respect to) cowl box 2 with the remainder of the construction of upper panel 7F being substantially similar to the above-described second embodiment.

FIG. 12 depicts a graph showing the results of the comparison between the second embodiment and the second comparative example. As with FIG. 10, the X-axis of FIG. 12 defines elapsed time and the Y-axis shows reaction force. In FIG. 12, a solid line shows the characteristic R1 of the second embodiment and a broken line shows the characteristic R4 of the second comparative example. As is seen from the graph of FIG. 12, one of skill would understand that a peak of the initial reaction force of the second embodiment (R2) is higher than that of the second comparative example (R4). Therefore, regarding increased initial reaction force, the construction of the second embodiment may be superior to that of the second comparative example.

As will be understood from the foregoing description, by preparing a construction wherein an upper wall of a dash upper panel may be formed having a recessed portion that is depressed toward the interior of the cowl box and is smoothly curved from the windshield holding surface to the vertical wall, increases n the initial reaction force may be achieved. In addition, by preparing a construction wherein a vertical wall (e.g., 5) is swelled toward the interior of the vehicle cabin, the increase in the initial reaction force may be greatly improved.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

Advantageously, to protect pedestrians against the shock from impacting the windshield, it may be preferable to increase a reaction force against the shock during an initial stage of the impact and reduce the reaction force during a latter stage of the impact. However, as described above in known cowl structure, because the shock absorption may be carried out by a bent part formed at the opening of the cowl, the bent part may easily deform by the applied shock and thus the bent part tends to show a large deformation against the shock in the initial stage resulting in lessened reaction force. Thus, in such cowl structure, it may be difficult to satisfactorily absorb the energy of impact. Accordingly, a cowl structure of a motor vehicle that may be capable of effectively absorbing an impact energy provides a bent part of a cowl box having configured to increase the initial reaction force.

What is claimed is:

1. A vehicle cowl structure, comprising:
a cowl box comprising a closed cross-section, the cowl box comprising:
an inclined holding surface configured to hold a lower end portion of a windshield;
an upper wall extending toward an interior of a vehicle cabin from an upper end of the inclined holding surface;
a vertical wall extending downward from an inside end of the upper wall;
a bottom wall extending toward a front portion of the vehicle from a lower end of the vertical wall; and
wherein the upper wall is depressed toward an inside of the cowl box and is smoothly curved from the inclined holding surface to the vertical wall, and
wherein the vertical wall is convex toward an interior of the vehicle cabin as a whole and has no concave portion between the upper wall and the bottom wall.

2. The vehicle cowl structure of claim 1, wherein an upper end portion of the vertical wall comprises a flat surface portion integrally connected to the upper wall having a predetermined vertical length.

3. The vehicle cowl structure of claim 1, wherein a rear end portion of the upper wall comprises a flat surface portion having a predetermined longitudinal length that is integrally connected to the vertical wall.

4. A vehicle cowl structure, comprising:
a cowl box comprising a closed cross-section, the cowl box comprising:
a holding surface means for holding a lower end portion of a windshield;
an upper wall means for extending toward an interior of a vehicle cabin from an upper end of the holding surface means;
a vertical wall means for extending downward from an inside end of the upper wall means;
a bottom wall means for extending toward a front portion of the vehicle from a lower end of the vertical wall means; and
wherein the upper wall means is depressed toward an inside of the cowl box and is smoothly curved from the holding surface means to the vertical wall means, and
wherein the vertical wall is convex toward an interior of the vehicle cabin as a whole and has no concave portion between the upper wall and the bottom wall.

* * * * *